March 11, 1952 R. F. STEHLIK 2,588,684

CHARGE RATE CALCULATOR FOR AUTOMATIC TELEPHONY

Filed April 25, 1947 2 SHEETS—SHEET 1

INVENTOR
RUDOLPH FRANK STEHLIK
BY Chas. W. Candy.
ATTORNEY.

CHARGE RATE CALCULATOR FOR AUTOMATIC TELEPHONY

Filed April 25, 1947 2 SHEETS—SHEET 2

INVENTOR
RUDOLPH FRANK STEHLIK
BY Chas. W. Cardy
ATTORNEY.

Patented Mar. 11, 1952 2,588,684

UNITED STATES PATENT OFFICE 2,588,684

CHARGE RATE CALCULATOR FOR AUTOMATIC TELEPHONY

Rudolph Frank Stehlik, Antwerp, Belgium, assignor to Automatic Electric Laboratories, Inc., Chicago, Ill., a corporation of Delaware Application April 25, 1947, Serial No. 743,963
In Great Britain July 26, 1939

Section 1, Public Law 690, August 8, 1946
Patent expires July 26, 1959

5 Claims. (Cl. 179—7.1)

The present invention concerns improvements in or relating to automatic or semi-automatic telephone systems and in particular is concerned with arrangements for determining the charging rate in large interlinked networks and especially in networks where at least three distinguishing digits are required before the actual charging rate can be determined.

The object of the present invention is to provide as economical arrangement as possible for dealing with the matter. For instance, where it is proposed to employ one or two digits to determine the zone of the called party and two additional digits to determine the exchange of the wanted party in the zone, it is usually not until the destination exchange is recorded with respect to the originating exchange that the tariff can be accurately assessed, particularly in the case where the charging rate is based upon distance from the originating exchange.

According to one feature of the invention, a switching device having a plurality of wipers each of which is adapted to make connection with contacts corresponding to different charging rates and which responds to one or more of the digits by which the zone and exchange of the called party are determined is adapted to have one of its wipers selected by another switching device which responds to other of said digits so that the charging rate is determined by the contact on which the selected wiper is resting, the same wiper being adapted to be selected by different settings of the second switching device as long as no contacts on which the selected wiper may be set correspond to more than one charging rate.

According to a further feature of the invention a number dialled by a calling party includes one or more digits representing the zone and at least two digits representing the exchange of the called party and one of a plurality of wipers of a two-directional switch which is set in accordance with the exchange digits dialled is adapted to be seleced in accordance with a plurality of values of the zone digit or digits which are chosen so that the charging rate is the same to any exchange represented by said zone digits for which the exchange digits alone are identical.

The determination of the charging rate for a call is necessary where a permanent record is to be made of the particulars of the call such as by printing or punching of a ticket or the like.

Figure 1:
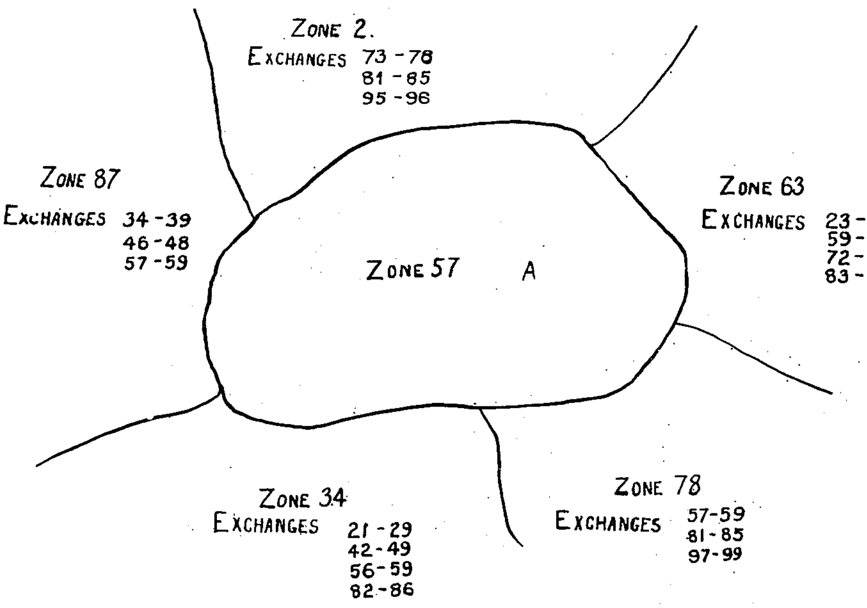
Figure 2:
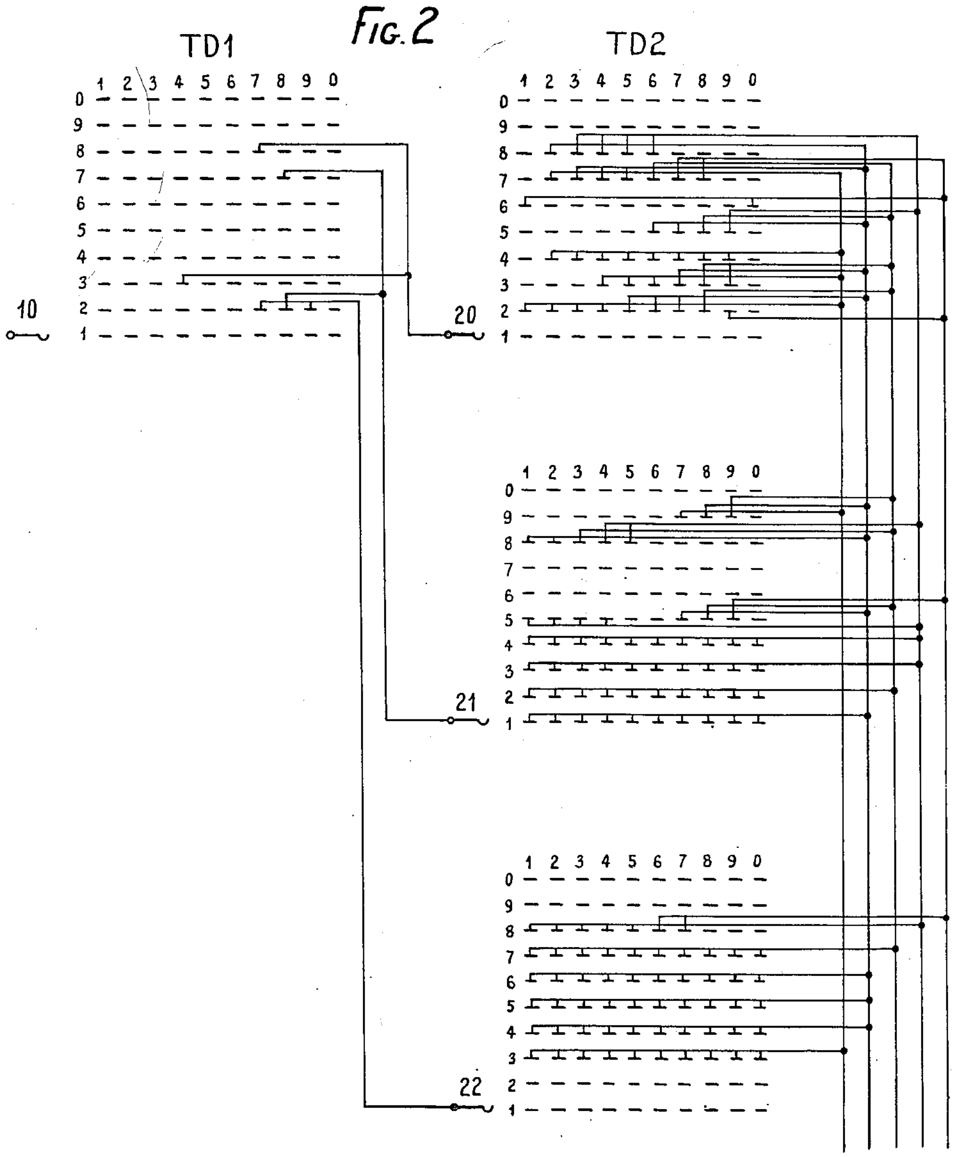

The invention will be better understood from the following description of one embodiment taken in conjunction with the accompanying drawings comprising Figs. 1 and 2.

In these drawings Fig. 1 shows a zone layout indicating the zone numbers and the numbers of the exchanges within each zone. In the description which follows consideration will be given to calls set up from zone 57 to the neighbouring zones. The charging rate is determined by a register-translator located at the originating exchange within zone 57 and which includes the directional switches TD1 and TD2 shown in Fig. 2. The register-translator performs a considerable number of other functions but since these have no bearing on the present invention they will not be described in detail. A full description of the register-translator will be found in J. E. Ostline's application Serial No. 278,727, filed June 12, 1939, now Patent No. 2,369,071, granted February 6, 1945, with reference to Figs. 7–26 thereof.

A subscriber at a particular exchange A in zone 57 sets up a connection to a subscriber at an exchange in another zone by dialling an eight digit number, each subscriber in the network having a five-digit number. Of this eight digit number the first digit is "0" and this is registered in the register-translator by the vertical movement of the switch TD1. Certain switching operations now take place and the switch TD1 releases and responds to the 2nd and 3rd digits dialled by the calling party which digits are indicative of the zone of the called party. The switch TD2 now responds to the 4th and 5th digits dialled by the calling party which digits are indicative of the exchange of the called party. The remaining three digits which represent the number of the called party in his own exchange are also registered by the register-translator and subsequently retransmitted unchanged.

Now the charging rate for the call is determined solely in accordance with the originating and destination exchanges and not on the route over which the connection passes. In the system shown in Fig. 1, five charging rates adequately cover calls from exchange A in zone 57 to any exchange in any other zone. The following table shows the various charging rates for such calls. The numbers in the left-hand column are the charging rates and the numbers in the remaining columns are the exchanges associated with the zone, the number of the zone being given at the head of the column.

| | 87 | 78 | 34 | 63 | 2 |
|---|---|---|---|---|---|
| 1 | 34–36, 46–48 | 97 | 21–24, 42–49 | 23, 24 | 73 |
| 2 | 37, 57 | 57, 81, 82, 98 | 25–27, 56, 57, 82 | 73–75 | 75–76, 81, 95, 96 |
| 3 | 38, 39, 58 | 58, 83, 99 | 28, 58 | 76 | 77, 82 |
| 4 | 59 | 84, 85 | 59, 83–86 | 59, 83–85 | 78 (1–4), 83–85 (4) |
| 5 | | 59 | 29 | 77, 78, 60, 61 | 78 (5–7) |

Referring now to Fig. 2 an example is given of the manner in which the bank contacts of the switch TD1 and TD2 are connected in order that the above scheme of charging applies. Consider first the case of a call to an exchange in zone 87. Wiper 10 of the switch TD1 will be set on to the 7th contact in the 8th level and this contact will be connected for example to wiper 20 of the switch TD2. Now the switch TD2 will be set in accordance with the next two digits dialled which are indicative of the exchange of the called party and by referring to the above table it will be seen that the 4th, 5th and 6th contacts in the 3rd level and the 6th, 7th and 8th contacts in the 4th level must be connected to conductor 1 of the rate conductors 1—5: the 7th contact in the 3rd and 5th levels are connected to conductor 2: the 8th contact in the 3rd and 5th levels and the 9th contact in the 3rd level are connected to conductor 3: and the 9th conductor in the fifth level is connected to conductor 4. Thus if the call is for exchange 37 in zone 87, wiper 10 will be set on to contact 87 and wiper 20 on to contact 37. A circuit is then completed from wiper 10 to conductor 2 of the rate conductor to cause the charging rate to be registered such as by the operation of a relay.

With this arrangement it is possible for wiper 20 to be selected by a different setting of the switch TD1, i. e. for a call to a different zone, provided that the contacts associated with wiper 20 and which represent exchanges in the different zone are not employed on calls to exchanges in zone 87 or if they are employed, i. e. if there is an exchange in each zone having the same exchange digits, the charging rates for calls to such exchanges must be the same.

Thus considering a call to zone 78 and referring to the table it will be seen that the following exchange digits are common to this zone and to zone 87: 57, 58 and 59. Now the charging rates for calls to exchanges 57 and 58 in both zones are the same but the charging rates for calls to exchanges 59 in the two zones are different and hence wiper 20 cannot be employed. It is to be noted that the difference between the charging rates on calls to exchanges 59 is the only bar to employing wiper 20 since with the exception of exchanges 57 and 58 all the other exchange numbers are different in the two zones. It is therefore arranged that wiper 21 shall be selected when wiper 10 is set on to the 8th contact in the 7th row. It is not considered necessary to explain in detail the connections from the bank contacts for the exchanges in zone 78 since these will be readily understood from the table.

With regard to calls to zone 34 it will be noted that this zone has the exchange numbers 46–48, 57–59 common with zone 87 and exchange numbers 57–59 and 82–85 common with zone 78. Calls to exchanges 46–48 and 57–59 have the same charging rates for zones 34–87 while calls to exchanges 57, 58, 82, 84 and 85 only have the same charging rates for zones 34 and 78. Hence wiper 20 of the switch TD1 can again be employed for determining the charging rates but not wiper 21. The appropriate bank contacts associated with wiper 20 are therefore connected to the appropriate rate conductors as shown.

The exchange numbers of zone 63 have 59 in common with zone 87; 83–85 and 59 in common with zone 78 and 23, 24, 59 and 83–85 in common with zone 34. It will be noted immediately that charging rate determination for zone 63 cannot be effected over wiper 21 since calls to exchange 59 in zone 78 are charged at rate 5 while those to exchange 59 in zone 63 are charged at rate 4. However, there is no conflict between the charging rates for the exchanges having common numbers in zones 63, 87 and 34 and hence charging for calls to zone 63 may be effected over wiper 20 of the switch TD2.

In some cases where a particular exchange in a zone has a capacity of more than 1000 lines, four numerical digits will be necessary for designating the subscriber's line in the exchange. In order to maintain uniformity in the numbering scheme a zone which includes such an exchange will be designated by a single digit only and an example of this has been inserted in the table. It is to be noted that in this case the position of wiper 10 of the switch TD1 will be different for different exchanges and hence it is not necessary for charging for all calls to zone 2 to be effected over the same wiper of the switch TD2. In the example given the second digit may be 7, 8 or 9 and hence for a call to any exchange within this zone wiper 10 will be set on to the 7th, 8th or 9th contact in the 2nd level. There is another point to be noted in connection with this example. The fourth digit to be received will be the first digit of the called party's number within his own exchange and if the called exchange has 1000 lines, all the contacts in the appropriate level of the switch TD2 will be connected together and to the appropriate rate conductor. For example, on a call to exchanges 95 and 96 in zone 2, wiper 10 will be set to the 9th contact in the 2nd level and the wiper of the switch TD2 which is to be selected must be one of which contacts in the associated 5th and 6th levels are all free or are connected to rate conductor 2. Hence, neither of the wipers 20 and 21 can be employed and a third wiper 22 has to be introduced of which all contacts in the 5th and 6th levels are connected together and to the rate conductor 2. With other exchanges however, particularly where the capacity is less than 1000 lines it may be possible to employ either wiper 20 or 21. For instance on exchanges 81–85 it is assumed that the capacity of exchange 85 is 400 lines only. In this case wiper 10 is set on to the 8th contact in the 2nd level. Now levels 1 to 4 associated with wiper 21 are vacant and level 5 is also vacant up to contact 6. Hence wiper 21 may be selected for determining the charging rates on calls to these exchanges, all the contacts on levels 1 to 4 and contacts 1–4 on level 5 being connected together and to the appropriate rate conductors.

It is also to be noted that an exchange may have a satellite exchange associated with it and included in the numbering scheme of the parent exchange. If the charging rates for calls to the parent and satellite exchanges are different the contacts in the particular level of the switch TD2 will not all be connected together. Thus in the exchange designation 78, the numbers 781–785 belong to a parent exchange and 786–787 to a satellite. Calls to the parent exchange are charged at rate 4 and to the satellite at rate 5 and hence contacts 1—5 in level 8 associated with wiper 22 are connected to rate conductor 4 and contacts 6 and 7 to rate conductor 5.

It will be appreciated that the above arrangement is given by way of example only in order that the principle of the invention will be readily understood. For this reason calls have been considered to only 5 zones having respectively 12, 12, 24, 15 and 12 exchanges. It will be seen that the number of zones dealt with can be increased while still employing only one wiper of the switch TD1. Actually of course the switch TD1 is capable of dealing with 100 zones. The corresponding increase in the number of exchanges, will of course, necessitate an increase in the number of wipers associated with the switch TD2 and it may in fact be essential to employ a third switch. This switch would be set in synchronism with the switch TD2 and a wiper of one or the other switches selected in accordance with the setting of the switch TD1.

It is also possible that the determination of the route over which the call is to be set up is effected by means of a second wiper of the switch TD1 co-operating with wipers of the switch TD2 in a similar manner to that described above. In this case the third switch referred to above will probably be essential.

It is also possible that in some cases the charging rate may be known when the calling party has dialled three digits only i. e. after the setting of the switch TD1 and in this case a connection may be made directly from the contact of the switch TD1 to the appropriate rate conductor.

I claim:

1. In a telephone system in which the number of a called station includes one or more zone digits representing the zone thereof and two exchange digits representing the exchange thereof; charge rate determining apparatus comprising a plurality of first wipers, a plurality of first contacts respectively corresponding to different charge rates applicable to connections and accessible to said first wipers, said first wipers selectively operable in two directions to select certain of said contacts in accordance with the two exchange digits of the number of said called station, a second wiper, a plurality of second contacts accessible to said second wiper and connected to different ones of said first wipers, and said second wiper selectively operable to select one of said second contacts in accordance with one or more of the zone digits of the number of said called station in order to establish the charge rate applicable to a call to said called station in accordance with the zone and exchange digits of the number thereof.

2. In a telephone system in which the number of a called station includes two zone digits representing the zone thereof and one or more exchange digits representing the exchange thereof; charge rate determining apparatus comprising a plurality of first wipers, a plurality of first conductors respectively corresponding to different charge rates applicable to connections and accessible to said first wipers, said first wipers selectively operable to select certain of said conductors in accordance with the exchange digit or digits of the number of said called station, a second wiper, a plurality of second contacts accessible to said second wiper and connected to different ones of said first wipers, and said second wiper selectively operable to select one of said second contacts in accordance with the two zone digits of the number of said called station in order to select the particular charge rate conductor corresponding to the charge rate applicable to a connection to said called station in accordance with the zone and exchange digits of the number thereof.

3. In a telephone system in which the called station number includes two zone digits representing the zone thereof and two exchange digits representing the exchange thereof; charge rate determining apparatus comprising a first plurality of wipers, a first contact set associated with each of said first wipers, said first wipers selectively operable respectively to select certain contacts in the associated first contact sets in accordance with the two exchange digits of the number of a called station, different charge rate conductors respectively connected to said selected contacts, a second wiper, a second contact set associated with said second wipers, conductors respectively interconnecting each of said first wipers with different contacts in said second contact set, and said second wiper selectively operable to select a contact in said second contact set interconnected with a particular one of said first wipers in accordance with the two zone digits of the number of said called station, whereby different charge rates are established to called stations having numbers containing different zone digits and identical exchange digits.

4. In a telephone system in which the number of a called station includes a zone digit representing the zone thereof and two digits representing the exchange thereof and a plurality of numerical digits representing the station; charge rate determining apparatus comprising a plurality of first wipers, a plurality of first contacts respectively corresponding to different charge rates applicable to connections and accessible to said first wipers, said first wipers selectively operable to simultaneously select certain of said first contacts in accordance with the second exchange digit and the first numerical digit of the number of said called station, a second wiper, a plurality of second contacts accessible to said second wiper and connected to different ones of said first wipers, and said second wiper selectively operable to select one of said second contacts in accordance with the said zone digit and the first of said two exchange digits of the number of said called station in order to select a particular one of said first wipers and thereby establish the charge rate applicable to a connection to said called station in accordance with the particular first contact selected by said selected first wiper.

5. In a telephone system in which a number of a called station includes two zone digits representing the zone thereof and two exchange digits representing the exchange thereof; charge rate determining apparatus including a first set of bank contacts, and a second plurality of sets of bank contacts, a first wiper operated in accordance with said two zone digits to select a contact in said first set of bank contacts, a second plurality of wipers operated in accordance with said two exchange digits to select respectively a separate contact in each set of said second sets of bank contacts, a plurality of different charge rate conductors terminating respectively in said separate contacts in each of said second sets of bank contacts and simultaneously selected in response to the operation of said second plurality of wipers, and a control circuit selectively completed in accordance with the operation of said first wiper to select said contact in said first set of bank contacts via a particular one of said plurality of second wipers and the charge rate conductor selected thereby for establishing an individual charge rate applicable to a connection to said called station in accordance with the zone and exchange digits of the number thereof.

RUDOLPH FRANK STEHLIK.

REFERENCES CITED

The following references are of record in the file of this patent:

UNITED STATES PATENTS

| Number | Name | Date |
|---|---|---|
| 2,222,905 | Hebel | Nov. 26, 1940 |
| 2,253,596 | Wright | Aug. 26, 1941 |
| 2,272,475 | Ostline | Feb. 10, 1942 |
| 2,273,165 | Wright | Feb. 17, 1942 |
| 2,305,779 | Hebel | Dec. 22, 1942 |
| 2,369,071 | Ostline | Feb. 6, 1945 |

FOREIGN PATENTS

| Number | Country | Date |
|---|---|---|
| 510,012 | Great Britain | July 25, 1939 |